United States Patent [19]

Kubo

[11] Patent Number: 4,616,419
[45] Date of Patent: Oct. 14, 1986

[54] MEASURING DEVICE FOR A FIGURE

[76] Inventor: Akio Kubo, 655, Yamanouchi Kamakura shi Kanagawaken, Japan

[21] Appl. No.: 724,150

[22] Filed: Apr. 17, 1985

[51] Int. Cl.$^4$ ............................................. G01B 5/26
[52] U.S. Cl. ..................................... 33/122; 33/121; 33/124; 33/141 R
[58] Field of Search ................. 33/122, 121, 123, 124, 33/141 R, 141 E, 142, 1 M, 18 R, 1 PT; 200/322, 335

[56] References Cited

U.S. PATENT DOCUMENTS

| | | | |
|---|---|---|---|
| 2,993,278 | 7/1961 | Lory | 33/122 |
| 3,121,956 | 2/1964 | Philbin | 33/121 |
| 4,246,703 | 1/1981 | Robinet | 33/141 R |
| 4,253,239 | 3/1981 | Houck | 33/141 R |
| 4,383,301 | 5/1983 | Morita et al. | 33/124 |
| 4,528,754 | 7/1985 | Houldsworth | 33/18 R |

FOREIGN PATENT DOCUMENTS 23487  6/1972  Japan .

OTHER PUBLICATIONS

*Aristo* catalog, "Planimeters, Integrators, Pantographs" pp. 102–108, Mar. 10, 1959.

Primary Examiner—Willis Little
Attorney, Agent, or Firm—Donald D. Mon; David O'Reilly

[57] ABSTRACT

A measuring device to measure a figure in which a measuring lever is pivotally attached to a carriage supported on a pair of wheels for reciprocal movement. A locking device pivotally mounted on the carriage prevents movement of the measuring lever. Release of the locking device resets data processing counters in the carriage to zero in preparation for a measurement. Measurements are performed by tracing a figure with a tracing device on an outboard end of said measuring lever which sends signals through a computer processor to a counter. A switch on the outboard end of the measuring lever allows measurements to be held.

8 Claims, 11 Drawing Figures

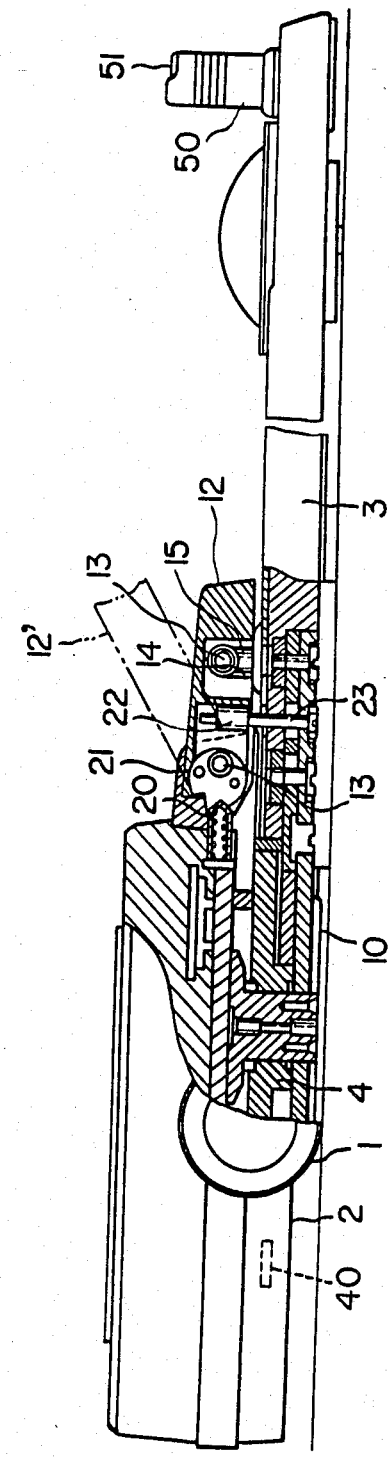
FIG. I(b)

F I G. 2
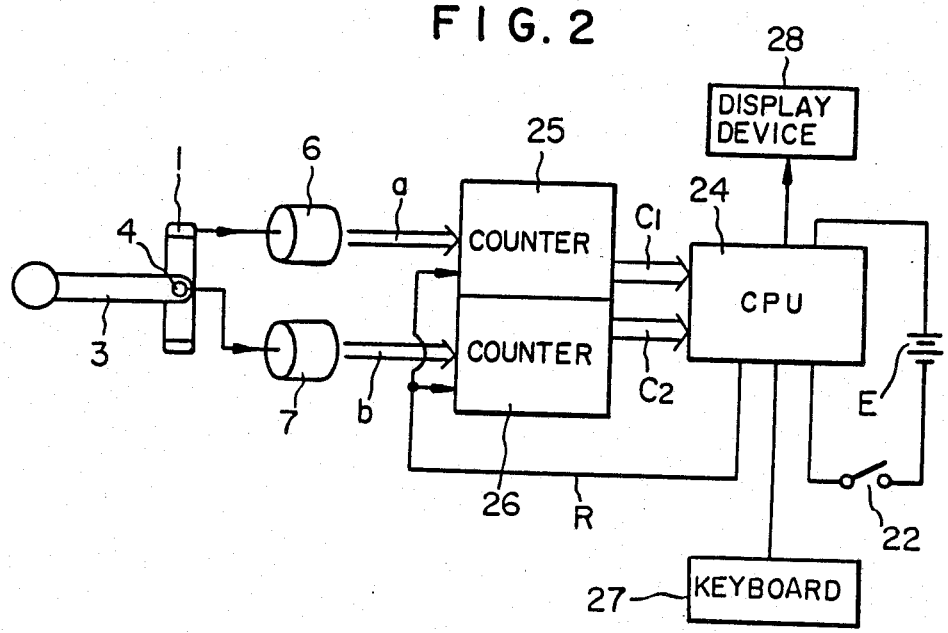
F I G. 3
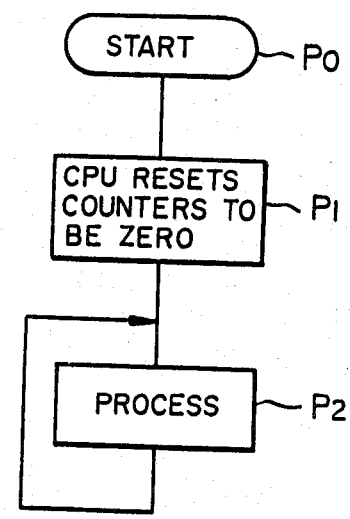

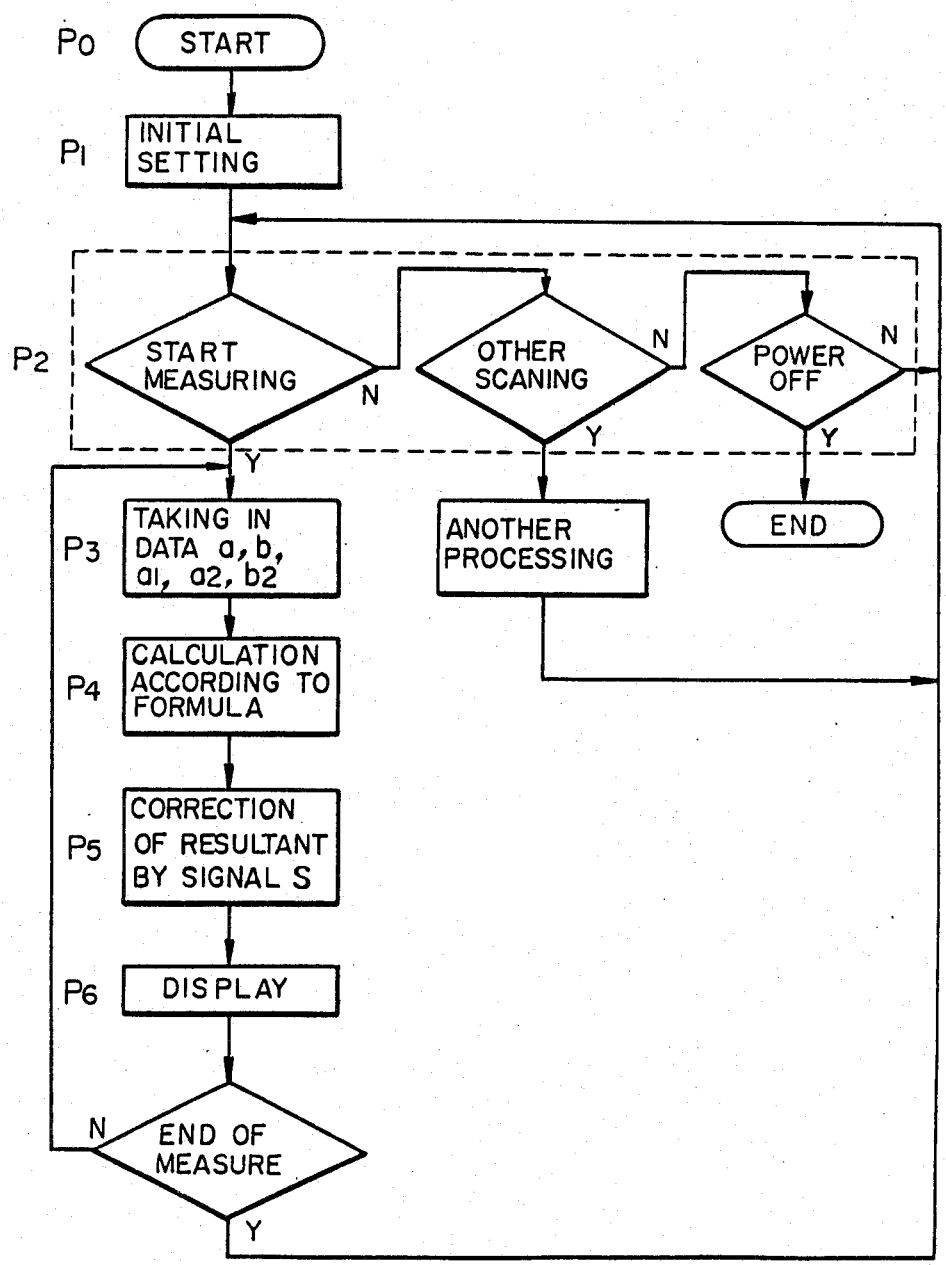

MEASURING DEVICE FOR A FIGURE

FIELD OF THE INVENTION

This invention relates to a measuring device for a figure such as linear planimeter, polar planimeter, XY plotter, for measuring the area of a figure, co-ordinate of a figure, or length of a curve on a figure.

BACKGROUND OF THE INVENTION

In a planimeter, signals according to rotation of a measuring lever, and a wheel during tracing of a figure to be measured are counted. It is necessary to clear (i.e., zero) the counters at the original or starting position, (i.e., right angle position of the measuring lever against the axis of the wheel). Heretofor, as shown in FIG. 4a, displacement of wheel 1 and measuring lever 3 are detected by encoders 6, 7 and their signals, a, b tabulated by counters 25, 26. Sensor G generates a specific pulse when measuring lever 3 passes the original point, and as shown in FIG. 4b, at step G1, an operator should move measuring lever 3 past the original point for clearing counters 25, 26. However step G1 operation is an inconvenience.

In use, an operator should trace a figure to be measured by tracing each part through a lens, but a figure is often out of the field of sight.

Moreover, variations because of the length of the measuring lever introduces errors and adjusting for the length is a troublesome matter.

BRIEF DESCRIPTION OF THE INVENTION

It is an object of this invention to eliminate these drawbacks by providing a locking device for locking the measuring lever in its original position (i.e., at a right angle to the axis of the wheels), with a switch provided in the locking device for generating a reset signal when the measuring lever is released, then clearing counters to zero. The switch may be provided on the measuring lever instead of the locking device so as to engage the locking device. Thereby, in use, the counters are cleared automatically by releasing operation of the measuring lever.

Another object of this invention is to provide a measuring device for a figure in which an eccentric lens is rotatably provided at the tracing part of the measuring lever so that it is possible for an image of the figure to be in sight of an operator by rotating the eccentric lens without moving the body.

Another object of this invention is to provide a measuring device for a figure in which a switch is provided for generating a bit, or few bit, signal for correcting or modifing the measured value so as to cancel any error due to the variation of the length of the measuring lever.

The above and other features of this invention will be more fully understood from the following detailed description and the accompanying drawings in which:

BRIEF DESCRIPTION OF THE DRAWINGS

FIG. 1b is a side view of the device of FIG. 1;
FIG. 2 is a block diagram of the device;
FIG. 3 is a flow chart illustrating operation of the device;
FIG. 8 is a flow chart of the device.

DETAILED DESCRIPTION OF THE INVENTION

Figure 1A:
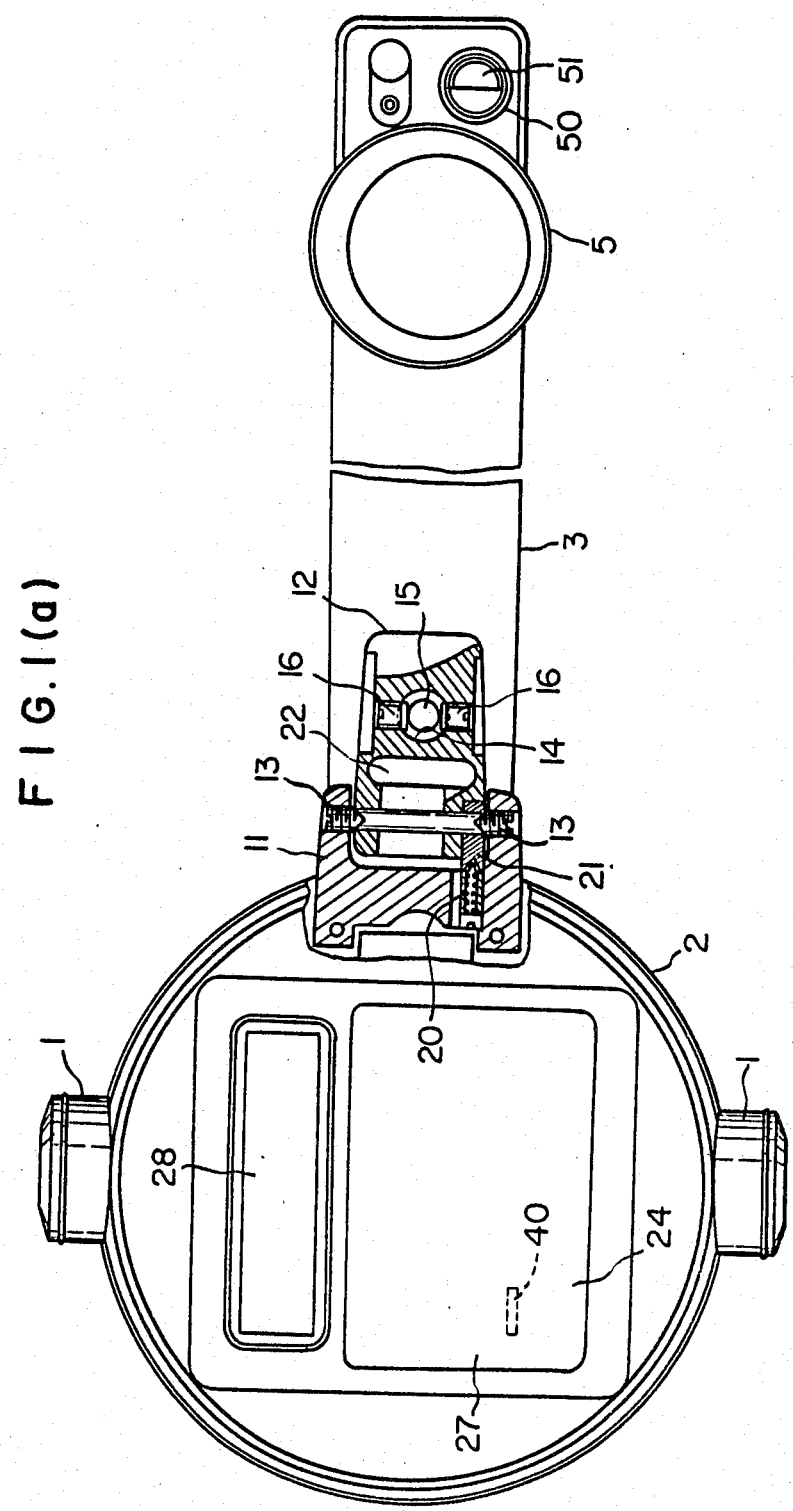
FIG. 1a is an elevation view of one embodiment of the invention in partial cross-section.
Figure 4A:
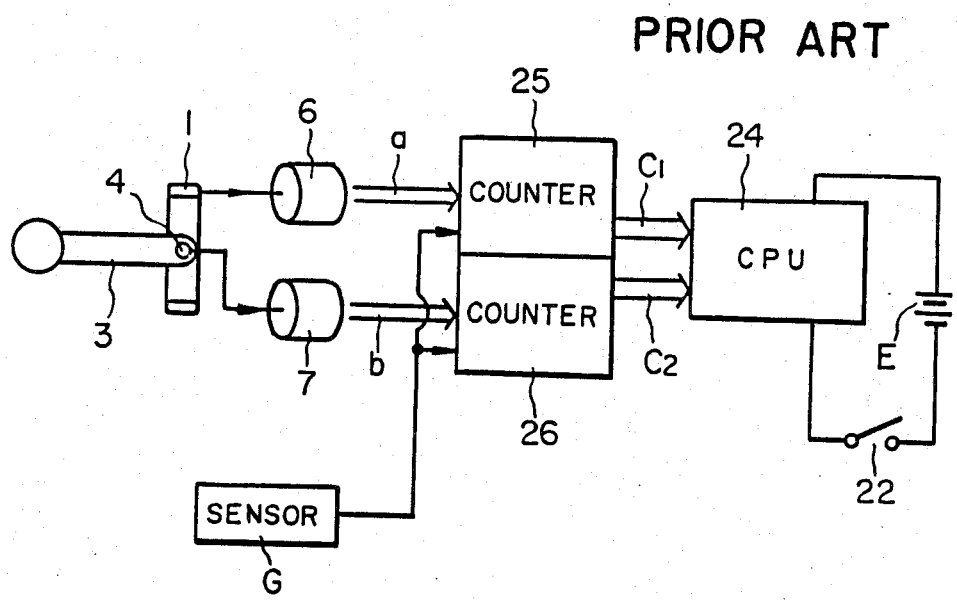
FIG. 4a is a block diagram of a prior art device.
Figure 4B:
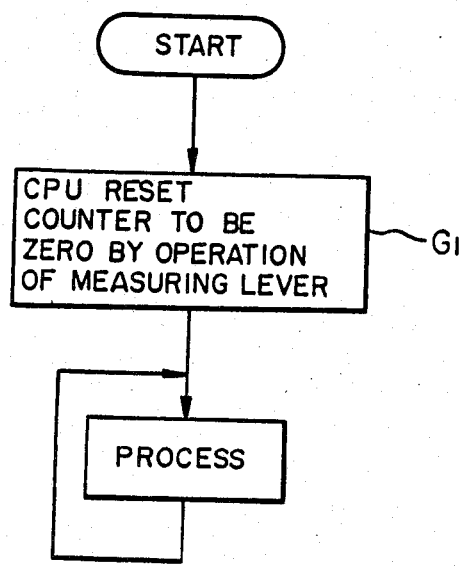
FIG. 4b is a flow chart of the prior art device.

FIGS. 1a and 1b show an embodiment of the invention applied to a linear planimeter in which a carriage 2 is supported by a pair of wheels 1,1 of sufficient wide width to reciprocally move along a straight line. A measuring lever 3 is pivoted at one end about vertical shaft 4 in a horizontal plane. Tracing part 5 is provided at the other end of measuring lever 3. Encoder 6 (FIG. 2) generates a signal whose number of pulses is proportional to the angular rotational displacement of wheel 1. Integral wheel 8 which contacts the face of a figure to be measured may be provided on measuring lever 3 instead of encoder 6. Encoder 7 generates a signal b whose number of pulses is proportional to the angular rotation (displacement) of measuring lever 3. The above-mentioned parts are the same as those of a conventional device eliminating the necessity for additional explanation.

As shown in FIG. 1a, bearing 11 is fixed on housing 10 support mounted on carriage 2. Locking device 12 is pivotally mounted on shaft 13 supported by said bearing 11 so as to rotate up and down. Pin 15 mounted on measuring lever 3, engages or enters depression 14 provided on the under face of said locking device 12. Adjusting screws 16 on opposite sides of depression 14 are for adjusting the locked position of measuring lever 3.

Click plate 21 provided on locking device 12 engages spring biased pin 20 provided on said bearing 11. Switch 22 is provided at the underface of locking device 12 and is actuated by actuating bar 23 on measuring lever 3. The position of switch 22 and actuating bar 23 is arbitrary.

As shown in FIG. 2 signal a,b, of encoders 6,7 are fed to counters 25,26 respectively with output signals c1, c2 fed to computer (i.e., CPU) 24. Electric source E is connected to the computer 24 through switch 22 which generates reset signal R when switch 22 is ON. Signal R clears counters 25, 26 to zero. However counter 25 for counting the signal need not be cleared.

Operation of the device is as follows.

As shown in FIG. 3, at step $P_0$, locking device 12 is in the position shown in FIG. 1b, with pin 15 of measuring lever 3 engaging depression 14; measuring lever 3 is locked and switch 22 is held on the OFF position by actuating bar 23 and electric source circuit E is open.

In use, the device is placed on a drawing, and locking device 12 is rotated upwardly as shown in dotted line 12' of FIG. 1b. In this position pin 15, escapes from depression 14 and locking device 12 releases measuring lever 3. Switch 22 separates from actuator 23 and turns ON connecting electric source E to computer 24, generating reset signal R clearing counters 25,26 as shown in step $P_1$.

Tracing part 5 is then moved so as to trace the figure to be measured. Wheels 1, 1 and measuring lever 3 rotate encoders 6, 7 to generate signals a,b which are counted by counters 25,26 and fed to computer 24 as signals C1,C2 shown in FIG. 3 as step $P_2$. The signals C1, C2 are by computer 24 according to the order of input from keyboard 27 and the area of the figure being traced is displayed on display device 28.

As explained above, in the present invention, measuring lever 3 is locked by locking device 12 when not in use, preventing rocking of the measuring lever. Release of measuring lever 3, automatically clears counters by reset signal R at an accurate neutral position of the measuring lever.

Figure 5A:
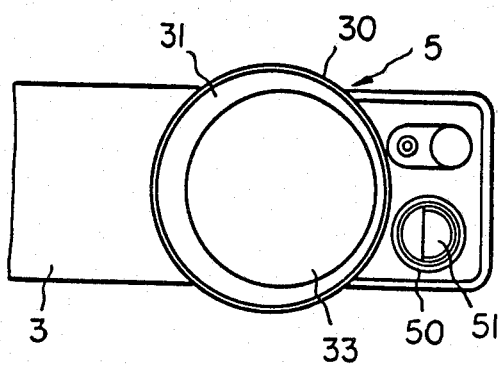
FIG. 5a is an elevational view of a portion of the invention.
Figure 5B:
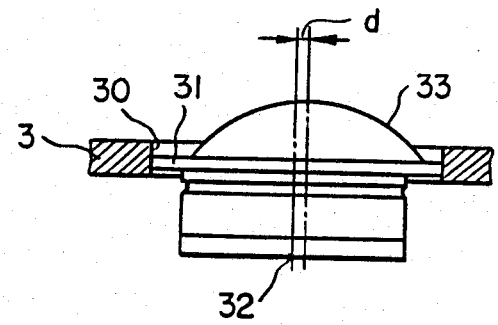
FIG. 5b is a cross-sectional view of the portion of the device shown in FIG. 5, taken along a longitudinal line.
Figure 6:
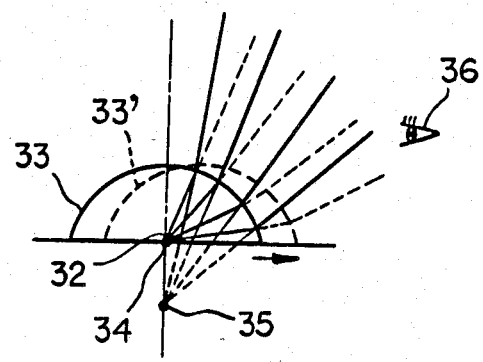
FIG. 6 is an explanatory view of the path of light through the lens.

As shown in FIGS. 5a and b, drawings of tracing part 5, cylindrical transparent member 31 is rotatably mounted in circular hole 30 at the end of measuring lever 3 and has tracing mark 32 provided at the center of the projecting lower face of transparent member 31. Eccentric lens 33 formed on the upper part of transparent member 31 having an eccentric radius displacement I. In FIG. 6, 34 is an actual image of the figure to be measured, 35 is a virtual image of the figure, and 36 is the position of the eye.

In use, if the image of the figure is out of the field of sight of an observer as shown in FIG. 6, the operator can rotate transparent member 31 so as to approach lens 33 as shown in 33', then the reflecting angle becomes lesser and an image of the figure come into the field of sight and an observer can see the figure without moving his body.

Figure 7:
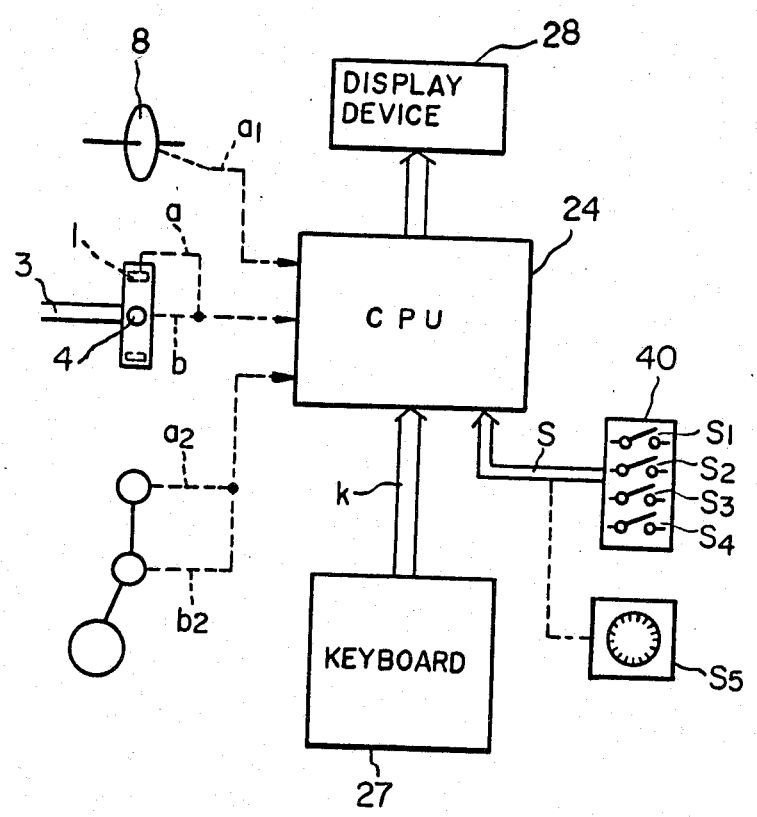
FIG. 7 is a block diagram of the device.

In this device, it is necessary to correct the measured values according to the variation of the length of the measuring lever 3 (i.e., the distance between the center of shaft 4 and tracing mark 32). For this purpose, switch 40 is provided in housing 10 as shown in FIGS. 1a and b. As shown in FIG. 7, switch 40 generates a four bit signal S by small switches s1, s2, s3, s4 or 16 position switch 55. Signal S is fed to computer 24. Signal a1 of integral wheel 8 may be fed to the computer instead of signal a,b. In the case of a polar planimeter, signal a2, and b2, are fed to the computer instead of signal a,b. Signal k is order input through keyboard 27.

Operation of the device is shown in FIG. 8. Step $P_0$, is the start (i.e., put device on the drawing). Step $P_1$ indicates the initial setting (i.e., clearing of counters 25,26 etc.). At step $P_2$ the measuring (i.e., tracing) starts and at step $P_3$, data, such as signals a, b, a1, a2, b2, are received by the computer. Calcuations are performed at step 4, the result is modified at step $P_5$ according to signal S and the resultant is displayed at step $P_6$. If the measuring is completed, the process returns to step $P_3$. If measurements are completed, the process returns to step $P_2$. If the mode of measuring varies, the steps proceed to the lateral steps from step $P_2$. Hold switch 50 extends upwardly from the end of measuring lever 3.

Switch 50 has semicular actuating part 51. If actuating part 51 is pushed, a value is fixed and each position of the figure can be plotted.

In connection with operation of switches 40 and 55, the small switches s1 to s4 or 16 position switch 55 are pre-set by a hand. The four bit signal generated by the switch 40 or 55 is used to compensate for a manufacturing error involved in the measuring lever 3. The switch 40, for example, can be pre-set to "0101" by closing s1 and s3. Alternatively, the switch 55 can be used by setting to position 5. In other words, either of the switches can function as a kind of memory which stores a compensation signal.

This invention is not to be limited by the embodiments shown in the drawings and described in the descriptions, which are given by way of example and not of limitation, but only in accordance with the scope of the appended claims.

I claim:

1. A measuring device for a figure comprising; a carriage supported by a pair of wheels for reciprocal movement along a straight line, a measuring lever extending from and pivotally mounted on a shaft attached to said carriage; tracing means provided at the other end of said measuring lever; a locking device for locking said measuring lever in a first horizontal position; switch means cooperating with said locking device for generating a reset signal when said measuring lever is released, said reset signal automatically clearing counters in said measuring device whereby release of said locking device operates sid switch generating a reset signal which measuring counters automatically.

2. A measuring device as claimed in the claim 1 in which, said switch means for generating said reset signal is provided adjacent said measuring lever for engagement by a locking device.

3. A measuring device for a figure as claimed in claim 2 including; an eccentric lens rotatably mounted at the tracing end of said measuring lever.

4. A measuring device for a figure as claimed in claim 1 including switch means for generating a four bit signal to compensate for any error due to variations caused by the length of said measuring lever.

5. A measuring device comprising; a carriage mounted on a pair of wheels for reciprocal movement; a measuring lever pivotally mounted on and extending outward from said carriage; locking means for preventing pivotal movement of said measuring lever when not in use; data processing means mounted in said carriage; said locking means having means for resetting said data processing means when said locking means is released.

6. The measuring device according to claim 5 in which said locking means comprises; a locking device pivotally mounted on said carriage above said measuring lever; a switch in said locking device; an actuating bar on said measuring lever holding said switch in an open position when said measuring lever is locked and releasing said switch to close when said locking device is released thereby resetting said data processor.

7. The measuring device according to claim 5 including eccentric lens means rotatably mounted on the outboard tracing end of said measuring lever for adjusting the field of view of an operator.

8. The measuring device according to claim 6 including compensating means for compensating for the length of said measuring lever; said compensating means comprising a four bit compensating signal generating means.

* * * * *